5758X
J. Thorpe.
Narrow Ware.
Patented Dec. 22, 1829.
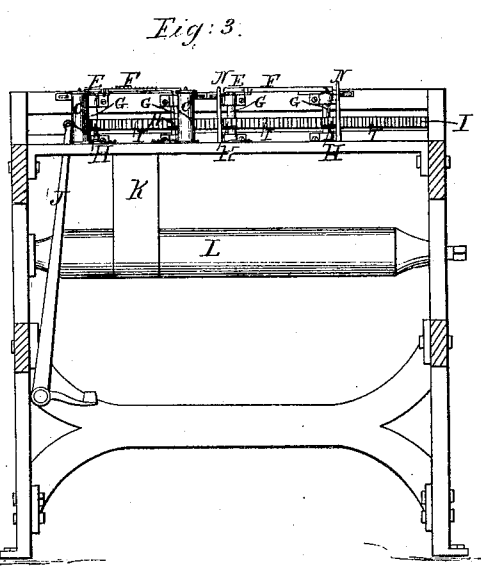
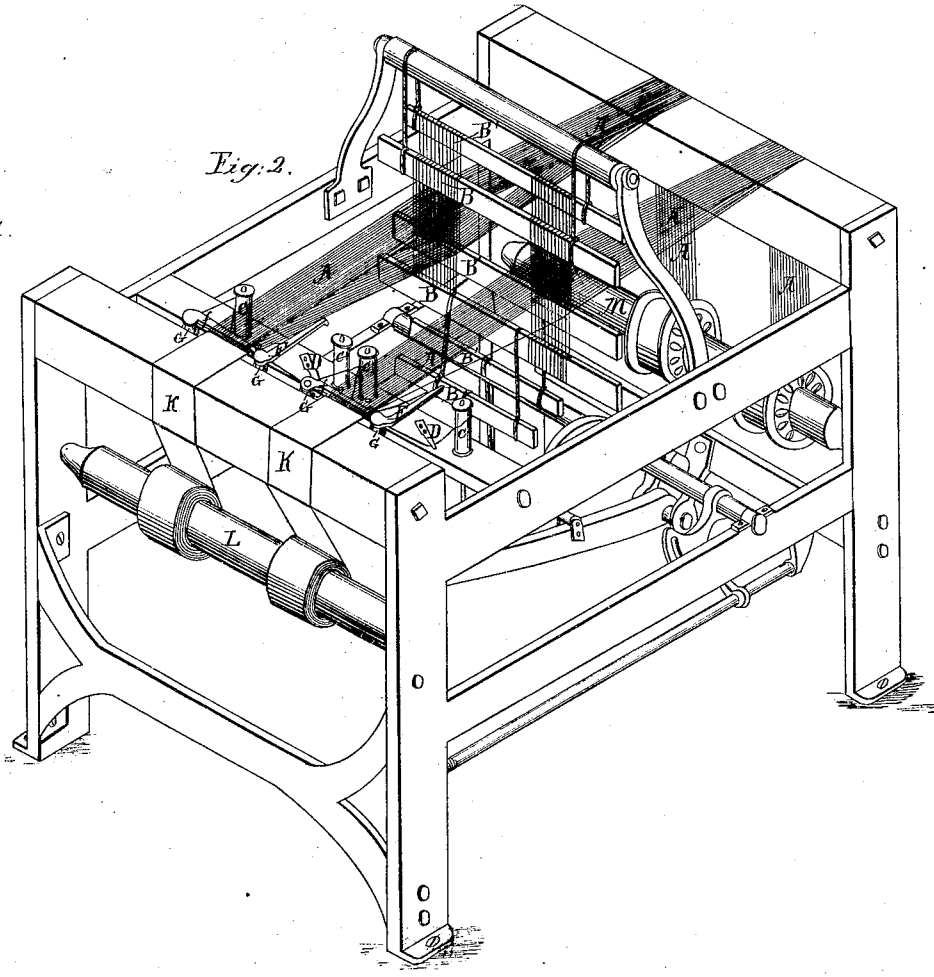
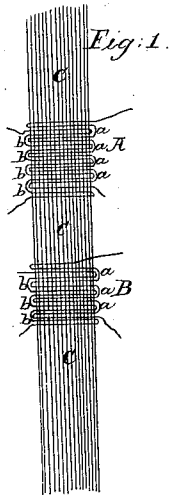
N. PETERS, PHOTO-LITHOGRAPHER, WASHINGTON, D. C.

United States Patent Office

PTO - BOYERS, PA Duty Station

MISSING PAGE TEMPORARY NOTICE

PATENT # 5758X FOR ISSUE DATE 12-22-1829 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

[illegible]

Data Conversion Operation

Boyers, Pa